Figure 1:
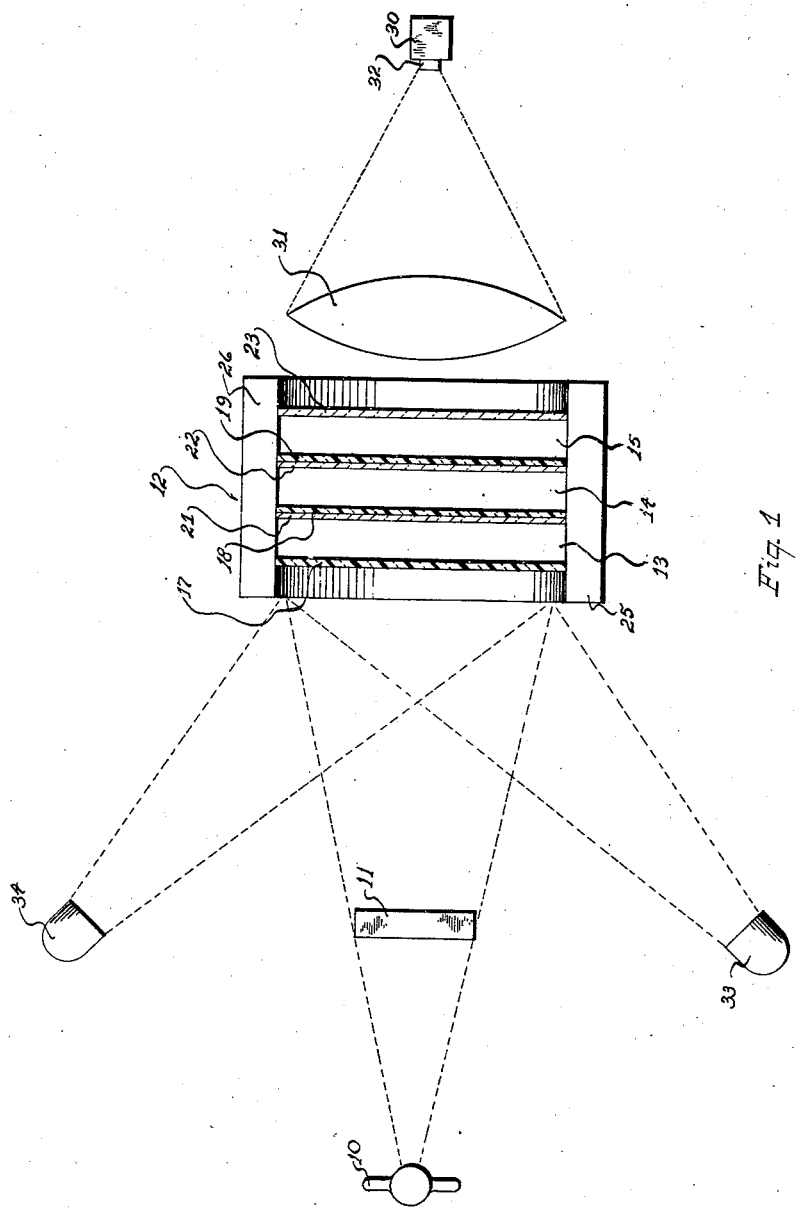

April 8, 1947.   S. H. NEDDERMEYER ET AL   2,418,523
METHOD AND APPARATUS FOR PRODUCING RADIOGRAPHS
Filed Sept. 18, 1945   2 Sheets-Sheet 1

INVENTORS,
Seth H. Neddermeyer
Donald W. Kerst
BY

April 8, 1947.  S. H. NEDDERMEYER ET AL  2,418,523
METHOD AND APPARATUS FOR PRODUCING RADIOGRAPHS
Filed Sept. 18, 1945  2 Sheets-Sheet 2

INVENTORS,
Seth H. Neddermeyer
Donald W. Kerst
BY
Robert A. Lavender

Patented Apr. 8, 1947

2,418,523

UNITED STATES PATENT OFFICE 2,418,523

METHOD AND APPARATUS FOR PRODUCING RADIOGRAPHS

Seth H. Neddermeyer, Pasadena, Calif., and Donald W. Kerst, Urbana, Ill., assignors to the Government of the United States, as represented by the Director of the Office of Scientific Research and Development, Office for Emergency Management Application September 18, 1945, Serial No. 617,130

11 Claims. (Cl. 250—65)

This invention relates to an improved method and apparatus for obtaining a radiograph or a shadowgraph of an object undergoing rapid change.

The copending application for U. S. Letters Patent, Serial Number 626,387, filed November 2, 1945 by R. R. Wilson, discloses a method and apparatus for obtaining a shadowgraph or radiograph of an object subjected to X-ray radiation. The advantages of the above identified invention reside in obtaining a well defined picture of an object interposed between an X-ray source and a cloud chamber when the distance between the source and the chamber is too great to employ a photographic plate for that purpose.

As pointed out in the above identified application, the study of certain devices subjected to explosive forces frequently imposes the necessity of spacing the X-ray source and recording equipment at substantial distances apart to prevent damage thereto by a relatively large amount of high explosive material employed, even when the X-ray source and recording equipment are suitably barricaded behind protective devices. As stated in the above identified application, a cloud chamber is perhaps 10,000 to 200,000 times more sensitive than is a photographic plate for the above stated purpose.

Under certain field conditions the distance at which a cloud chamber recording apparatus must be placed from even a strong X-ray source is such that the intensity of X-rays arriving at the cloud chamber adapted to record an image is extremely weak. Under these conditions the resulting shadowgraph, which is normally photographed by associated cameras, may not be of the required definition for satisfactory results. The present invention provides means for improving the definition of shadowgraphs produced by weak X-rays of extremely short time duration through the employment of a plurality of contiguously aligned cloud chambers in a manner to obtain superposition of the resulting vapor trails.

It is therefore a primary object of the invention to provide an improved method for obtaining a shadowgraph of an object undergoing change.

A further object of the invention resides in the provision of improved shadowgraph apparatus for obtaining clearly defined shadowgraphs of an object interposed between the apparatus and an X-ray source spaced considerable distances from an object which is opaque or semi-opaque to the transmission of X-rays, the intensity of X-rays being extremely weak in the vicinity of the shadowgraph apparatus.

A still further object of the invention is to provide an assembly of cloud chambers particularly adapted to record variation in X-ray intensities in a manner to define a shadow, the X-rays being emanated from a source which is pulsed in the time order of a microsecond or less.

A still further object of the invention is to provide a multiple cloud chamber apparatus for radiographically recording the physical characteristics of an object subjected to X-ray radiation, the apparatus including improved means for photographically recording a shadowgraph produced thereby.

Other objects and advantages of the present invention will become apparent to persons skilled in the art upon examination of drawings, the description, and the appended claims.

Figure 2:
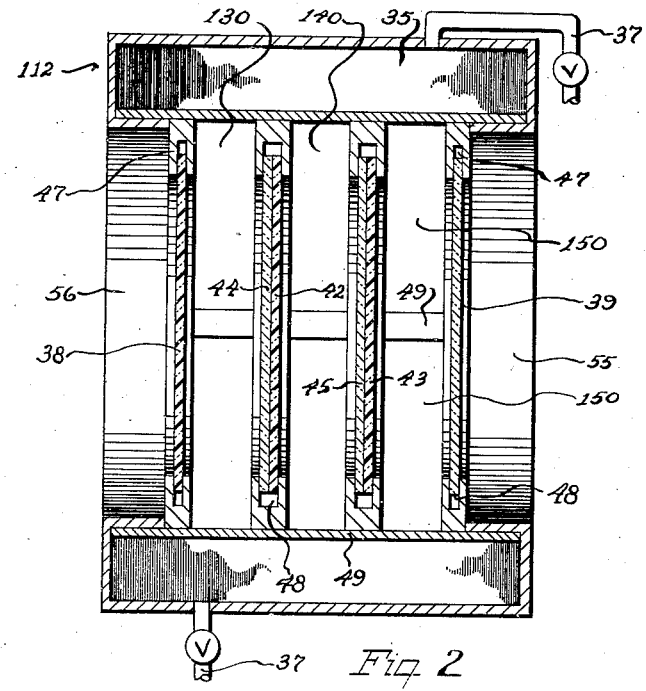
Figure 3:
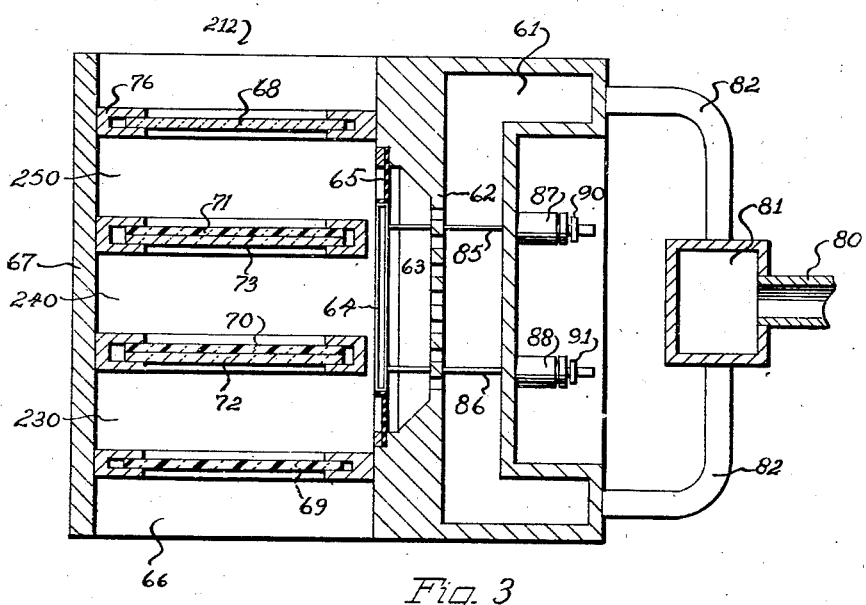

In the drawings in which like parts are designated by the same reference numerals; Figure 1 schematically illustrates apparatus incorporating the invention; Figure 2 illustrates in detail a device including plural cloud chambers simultaneously operable, and Figure 3 is a fragmentary view in horizontal section illustrating an alternate embodiment of the invention.

Referring to Figure 1, which illustrates schematically an apparatus for obtaining improved shadowgraphs in accordance with the present invention, a source of X-rays 10 is spaced from an object 11 to be shadowgraphed, object 11 being spaced from a device 12 comprising a plurality of cloud chambers. Device 12 may consist of cloud chambers 13, 14, and 15, each provided with a pair of opposite walls, one of which is partially opaque to X-rays, both of which are transparent to light rays. The walls of each chamber on the side thereof facing source 10, for example wall 17, 18, and 19, shown heavily cross-hatched, may be of lead glass, the walls 21, 22 and 23 on the opposite side of each chamber 13, 14 and 15 respectively being preferably of ordinary glass. The lead glass walls serve as absorbers for the photons; the function of the ordinary glass walls is to prevent backward scattering of the electrons which would tend to produce a diffuse image.

Cloud chambers 13, 14, and 15 differ from those normally employed in the nuclear physics art in that means for reduction of internal pressure to place the chambers in simultaneous operative condition are disposed laterally of the effective chamber area to provide a structure permitting the transmission of light completely through said effective areas. In Figure 1, device 12 includes a pair of laterally disposed rectangles 25 and 26, diagrammatically illustrating the relative position of the actuating means. A radiograph formed within device 12, in a manner later described, may be photographed by camera 30, a large lens 31 being interposed between device 12 and camera 30, the conjugate foci of lens 31 being at the lens 32 of camera 30 and at the X-ray source 10. The function of lens 31 is to eliminate the effect of three dimensionality of the image, which with an ordinary optical system would make the image appear diffuse. Device 12 is illuminated by flood lamps 33 and 34 disposed laterally of the X-ray beam intermediate object 11 and device 12.

Figure 2 is a detailed cross sectional view of a shadowgraph device 112 particularly adapted for use with the method taught herein. The device is of generally cylindrical configuration, comprising an annular chamber 35, provided with a plurality of conduits 37 adapted to lead to a pressure reducing device, not shown, such as a vacuum device. Pressure reduction or volume expansion may be limited to a predetermined value in a manner later described in reference to the device of Figure 3. The structure defining chamber 35 provides support for a plurality of contiguously disposed transverse chambers 130, 140, and 150 of cylindrical conformation. Circular end walls 38 and 39 comprise circular glass plates of single thickness, plate 38 being of lead glass and plate 39 of plain glass. The intervening walls defining the plural chambers are of glass plates, plates 42 and 43 being of lead glass, and plates 44 and 45 of plain glass. Lead glass plates 38, 42 and 43 act as absorbers for photons, plates 44 and 45 being provided to prevent backward scattering of the electrons into chambers 130 and 140 from plates 42 and 43 respectively. Plate 39 serves merely as a light transmitting wall.

The glass walls defining the plural chambers find their support in annular brackets 47 provided with suitable channels 48 in which marginal portions of the glass plates are recessed in clamped or adhesive engagement therewith. Brackets 47 are mounted on four elongated stringers 49 preferably of low cross sectional area to permit substantially unrestricted gas communication between annular chamber 35 and chambers 130, 140, and 150. Cylindrical wall portions 55 and 56 have their inner margins in sealing relation with the brackets 47 supporting the outermost glass plates of the chamber assembly to complete gas sealing of the interior of the device in respect to the surrounding atmosphere.

Referring to Figure 3, a multiple chamber device 212, illustrated in horizontal section, incorporates a further embodiment of the invention, the device being generally rectangular. A manifold chamber 61 communicates through a multiple apertured plate 62 with an associated chamber 63 which has disposed therein a volume expanding piston 64 mounted by means of a marginal diaphragm 65 for movement of the piston 64 from the position shown to a position abutting apertured wall 62. Piston 64 together with marginal diaphragm 65 provides a movable fluid seal between chamber 63 and the plurality of chambers contained within a housing defined by a side wall 67, a bottom wall 66, a top wall, not shown, and end walls 68 and 69. Wall 69 is of lead glass and wall 68 of plain glass. The intervening walls dividing the housing into plural chambers 230, 240 and 250 comprise double glass plates, plates 70 and 71 being of lead glass, and plates 72 and 73 of plain glass. Chambers 230, 240 and 250 correspond generally to chambers 130, 140 and 150 of the device of Figure 2, and to chambers 13, 14 and 15 of device 12 of Figure 1, the device being adapted to receive image carrying radiations in a manner later described. Brackets 76 are rectangular and are provided with suitable channels for the support of associated rectangular glass plates on three sides thereof. Unlike the chambers in the device of Figure 2, chambers 230, 240, and 250 are mutually segregated in respect to gas communication therebetween except at the open ends thereof adjacent plunger 64. Volume expansion is simultaneously effected within the plural chambers in the following manner.

A source of vacuum, not shown, is associated within the device through a conduit 80 leading to chamber 81 from which a plurality of conduits 82 lead to manifold chamber 61. The size of conduits 80 and 82 as well as the number of conduits 82 employed are dependent upon the actual structural details of the device. It is required that a sufficient vacuum be rapidly created within the manifold chamber 61 and its associated chamber 63 to rapidly draw piston 64 from the position shown to a position abutting apertured wall 62, thereby effecting simultaneously volume expansion within the chambers 230, 240 and 250. Adjustable limiting rods 85 and 86 have corresponding ends fixed to piston 64 and opposite end portions slidably associated with suitable gas seals 87 and 88 respectively, intervening rod portions extending through wall 62 in slidable relation therewith. Seals 87 and 88 may be of the Wilson type or of any suitable known type to insure sealing between the interior of the manifold 61 and the atmosphere. Rods 85 and 86 are provided with adjusting devices 90 and 91, exteriorly of seals 87 and 88 respectively, to permit adjustment of the piston 64 in respect to wall 62 prior to the application of the vacuum to the system for the purpose of selectively adjusting the extent of volume expansion resulting within the plural chambers of the device.

The volume expansion portion of the device of Figure 3, above described, may be conveniently adapted for use with the device of Figure 2. Since it is necessary to regulate the volume expansion of cloud chambers, the degree of supersaturation therein being critical, the plural chamber portion of the device of Figure 3 may be replaced by a manifold chamber of known design having plural conduits leading therefrom, which may be identical with the plural conduits 37 of the device of Figure 2, expansion being controlled by adjustment of rods 85 and 86 in the manner above described.

Returning to Figure 1, operation of the device is as follows: Rapid expansion is initiated within device 12 momentarily prior to the pulsing of X-ray source 10, the required time interval between placing cloud chambers in operable condition and subjecting such chambers to ionizing radiation being readily understood by persons skilled in the art. Upon initiation of an X-ray burst from source 10, the shadow of object 11, the object being either opaque or semi-opaque to the transmission of X-rays, is projected upon the adjacent wall of each of the individual cloud chambers. This shadow may be considered as an image carrying incident radiation.

Since any system for detecting X-rays actually detects electrons ejected by the radiation rather than the radiation itself, the image is formed in the present apparatus as follows: Lead glass walls 17, 18, and 19 serve as absorbers for photons, X-rays of varying intensities absorbed thereby resulting in the emission of electrons from the inner surfaces of the walls to traverse at least a portion of the space within the effective area of each chamber to produce vapor trails in a manner well known in the art. A portion of the X-rays will however traverse lead glass wall 17 to effect electron emission from lead wall 18 while still other X-rays will in like manner effect electron emission from wall 19. Since the number of electrons ejected is proportional to the number of X-ray photons traversing each lead glass plate, each individual chamber responds in proportion to the number of photons in unit cross section of the beam. The resulting shadowgraph is made up of successive batches of vapor trails produced by secondary reflections, the batches being superimposed in the final image to obtain greater density and a more clearly defined contrast than is obtainable from a single chamber. The use of ordinary glass walls opposite the lead glass walls reduces backward scattering of the electrons avoiding production of a diffuse image.

In view of the above teaching it is apparent that the multiple cloud chamber devices of Figures 2 and 3 are used in a manner similar to device 12 of Figure 1, the related equipment necessary to carry out the method taught not being shown for the purpose of avoiding duplication.

Referring to Figure 2, the device is employed in the same relative position as is device 12, Figure 1, chamber 130 being nearest the source of X-rays with the resulting shadowgraph preferably being photographed from the opposite or right hand side of the device, i. e., looking into the chamber 150. The device of Figure 3, shown in horizontal section, is adapted to be positioned with chamber 230 nearest the X-ray source with the interior of the device photographed from the opposite end. The invention is however not limited to the manner in which a photograph may be obtained since it is evident that camera 30 may be disposed in oblique relation to the chamber initially receiving X-rays, or if desired, a mirror may be placed directly within the X-ray beam with the camera suitably disposed laterally of the beam to obtain a frontal photograph effectively from the axis of X-ray radiation.

The above method and apparatus has particular utility for use in analyzing objects with a magnetic induction accelerator, or so-called "betatron" as the X-ray source. Due to the fact that the X-ray beam intensity from such a device is less than from conventional X-ray apparatus, ordinary photographic methods, are generally ineffective with the time duration of the X-ray burst confined to a few microseconds or less. The magnetic induction accelerator is ideal for the production of such an X-ray burst of a few microseconds in length. As above mentioned a single cloud chamber may be employed, as taught by Robert R. Wilson, but with X-rays of very low intensities and extremely short time duration, a more clearly defined shadowgraph is obtainable by the present method.

The specific apparatus above described and illustrated is not to be construed as limiting the spirit and scope of the invention which is defined with particularity in the following claims.

We claim:

1. In apparatus for obtaining a shadowgraph, the combination with an X-ray source and an object spaced therefrom and subjected to radiation by said source, of means responsive to weak X-rays of varying intensities, said means comprising a plurality of aligned cloud chambers disposed in respect to said source and said object in a manner to receive incident radiation carrying the image of said object, portions of said chambers presented to said image-carrying radiation being transparent to light and semi-opaque to X-rays, and means disposed along the axis of said image-carrying radiation for photographically recording the composite image presented by said chambers.

2. A device for shadowgraphically detecting an image defined by incident radiation from a remote X-ray source when the intensity of such radiation is extremely small, said device comprising a plurality of independently operable cloud chambers having opposite walls partially opaque to X-rays and transparent to light, said chambers being contiguously disposed in respect to said walls to permit alignment of said device with the axis of a path of image-carrying radiation, whereby resulting shadowgraph images appearing in the individual chambers are observable as a composite image through said light transmitting walls.

3. A method of obtaining a shadowgraph of an object subjected to very rapid change, comprising subjecting said object to a source of X-rays pulsed in the order of a microsecond, disposing said object in spaced relation to said source, disposing a plurality of aligned cloud chambers spaced from said source and said object in a manner to receive a projected shadow of said object; said source, object, and chamber being aligned in respect to the axis of incident radiation forming said shadow with said object disposed intermediate said source and chambers, said chambers being provided with light transmitting portions transverse to the axis of shadow forming radiation.

4. A method of obtaining a shadowgraph of an object comprising subjecting said object to X-ray radiation in a manner to provide incident image-carrying radiation, said radiation being in the time order of a microsecond, and disposing a plurality of X-ray translucent and light transparent cloud chambers in contiguous alignment in respect to the axis of incident radiation, whereby to provide a plurality of cloud chamber images aligned in respect to the axis of incident radiation forming a composite shadowgraph consisting of the combined cloud chamber tracks of each of said plural chambers when viewed along said axis.

5. A method of obtaining a shadowgraph of an object comprising subjecting said object to X-rays in a manner to provide incident image carrying radiation and disposing a plurality of X-ray translucent and light ray transparent cloud chambers in contiguous alignment in respect to the axis of incident radiation, whereby a plurality of cloud chamber images aligned in respect to the axis of incident radiation provides a composite shadowgraph when viewed along the axis of said incident radiation.

6. In a device of the character described, the combination with a plurality of cloud chamber compartments each having a pair of opposite side walls, said compartments being in contiguous disposition in respect to said walls, one wall of each chamber being of X-ray and light transparent material, the opposite wall being of material semi-opaque to X-rays and transparent to light, and means for simultaneously expanding the volume in said compartments whereby to provide a plurality of cloud chambers.

7. A cloud chamber apparatus comprising a chamber sealed from the atmosphere, and means associated with said chamber for rapidly expanding the volume thereof a predetermined amount, said chamber being interiorly provided with aligned compartments closed on all sides and on one end, the opposite ends thereof opening toward said volume expanding means, the opposite walls of each compartment along the axis of alignment being semi-opaque to X-rays and transparent to light.

8. The method of improving X-ray produced cloud chamber images which comprises directing an X-ray beam through a series of axial aligned cloud chambers, simultaneously expanding said chambers, illuminating said chambers, and photographing the aligned images produced in said cloud chambers to obtain a composite image.

9. A method of recording the physical character of an object undergoing rapid change, said method comprising subjecting said object to X-ray radiation pulsed in the time order of a microsecond and causing incident image carrying radiation throughout an area shadowed by said object to effect individual vapor trail images in a plurality of aligned cloud chambers, whereby said plural images form a composite shadowgraph when viewed along the axis of incident radiation.

10. Apparatus of the class described comprising an annular chamber and a plurality of aligned chambers enclosed by said annular chamber in right angularity to the axis thereof, said aligned chambers being in gas communication with said annular chamber, said aligned chambers being defined by a light-transmitting material, at least a wall portion of each chamber being semi-opaque to the transmission of X-rays, and means associated with said annular chamber to effect pressure reduction within said aligned chambers, whereby upon the introduction of a volatile substance within said annular chamber the aligned chambers effectively provide, upon rapid pressure reduction therein, a plurality of aligned cloud chambers.

11. In a device of the character described, the combination with a housing sealed to the atmosphere and provided with a resilient outer wall and interiorly compartmentalized in a manner to provide a plurality of individual chambers interconnected for gas communication therebetween adjacent said resilient wall, said housing and said chambers having wall portions transparent to light and semi-opaque to X-ray transmission in a manner to permit visual access to all of said compartments along one axis while impeding X-ray transmission therethrough along the same axis, of vacuum means for outwardly distorting said resilient housing wall to effect expansion of the volume therein, and means for limiting the extent of said wall distortion for the control of said volume expansion to a preselected value.

SETH H. NEDDERMEYER.
DONALD W. KERST.